US012643816B2

(12) United States Patent　　　　(10) Patent No.: US 12,643,816 B2

Lappe et al.　　　　　　　　　　　　(45) Date of Patent: Jun. 2, 2026

(54) METHOD AND DEVICE FOR THE PRODUCTION OF CEMENT CLINKER

(71) Applicants: thyssenkrupp Industrial Solutions AG, Essen (DE); VICAT SA, L'Isle-d'Abeau (FR); DYCKERHOFF GMBH, Wiesbaden (DE)

(72) Inventors: Thomas Lappe, Bergkamen (DE); Eike Willms, Dortmund (DE)

(73) Assignees: thyssenkrupp Polysius GmbH, Beckum (DE); VICAT SA, L'Isle d'Abeau (FR); DYCKERHOFF GMBH, Wiesbaden (DE)

( * ) Notice: Subject to any disclaimer, the term of this patent is extended or adjusted under 35 U.S.C. 154(b) by 735 days.

(21) Appl. No.: 17/916,966

(22) PCT Filed: Mar. 25, 2021

(86) PCT No.: PCT/EP2021/057662

§ 371 (c)(1),
(2) Date: Oct. 4, 2022

(87) PCT Pub. No.: WO2021/204549

PCT Pub. Date: Oct. 14, 2021

(65) Prior Publication Data

US 2023/0150871 A1　　May 18, 2023

(30) Foreign Application Priority Data

Apr. 8, 2020 (BE) ................................. 2020/5226
Apr. 8, 2020 (DE) ..................... 10 2020 204 519.4

(51) Int. Cl.
*C04B 7/43*　　　　(2006.01)
*C04B 7/44*　　　　(2006.01)
*C04B 7/47*　　　　(2006.01)

(52) U.S. Cl.
CPC ................ *C04B 7/47* (2013.01); *C04B 7/434* (2013.01); *C04B 7/4415* (2013.01)

(58) Field of Classification Search
CPC ......... C04B 7/47; C04B 7/434; C04B 7/4415; C04B 7/44; C04B 7/43
See application file for complete search history.

(56) References Cited

U.S. PATENT DOCUMENTS

| | | | |
|---|---|---|---|
| 2,301,855 | A | 11/1942 | Cliffe |
| 3,162,431 | A | 12/1964 | Franz et al. |
| 4,248,639 | A | 2/1981 | Quittkat |
| 4,627,877 | A | 12/1986 | Ogawa et al. |
| 4,840,561 | A | 6/1989 | Unland et al. |
| 4,941,821 | A | 7/1990 | Durr et al. |
| 5,292,247 | A | 3/1994 | Bauer |
| 5,649,823 | A | 7/1997 | Tutt |
| 5,919,301 | A | 7/1999 | Rother et al. |
| 6,012,918 | A | 1/2000 | Doumet |

| | | | |
|---|---|---|---|
| 6,142,771 | A | 11/2000 | Doumet |
| 7,296,994 | B2 | 11/2007 | Meyer et al. |
| 7,390,357 | B2 | 6/2008 | Skaarup et al. |
| 10,457,599 | B2 | 10/2019 | Leibinger |
| 2003/0105381 | A1 | 6/2003 | Eckert et al. |
| 2007/0178418 | A1* | 8/2007 | Meyer ..................... F27D 17/10 432/14 |
| 2009/0130615 | A1 | 5/2009 | Penfornis et al. |
| 2009/0308073 | A1 | 12/2009 | Bonaquist et al. |
| 2010/0037804 | A1 | 2/2010 | Lafarge |
| 2012/0174832 | A1 | 7/2012 | Mathai |
| 2012/0304905 | A1 | 12/2012 | Periasamy et al. |
| 2014/0069303 | A1 | 3/2014 | Mathai |
| 2014/0366499 | A1 | 12/2014 | Sakaniwa et al. |
| 2015/0336845 | A1 | 11/2015 | Lampe et al. |
| 2018/0127312 | A1 | 5/2018 | Leibinger |
| 2019/0093950 | A1 | 3/2019 | Peltonen |
| 2021/0198142 | A1 | 7/2021 | Lemke et al. |
| 2021/0198143 | A1 | 7/2021 | Liu et al. |
| 2021/0372700 | A1* | 12/2021 | Brinkmann ............. F27D 17/20 |

FOREIGN PATENT DOCUMENTS

| | | |
|---|---|---|
| CN | 201173677 Y | 12/2008 |
| CN | 103253879 A | 8/2013 |
| CN | 106164011 A | 11/2016 |
| CN | 108474618 A | 8/2018 |
| DE | 1 601 124 A1 | 5/1970 |

(Continued)

OTHER PUBLICATIONS

DE-10327028-A1, machine translation (Year: 2005).*
Cemcap, "CO2 capture from cement production", D8.3 Assessment of calciner test results Revision 1, C.T.G. SPA, 21 pages (2017).
TR-ECRA (European Cement Research Academy) Technical Reports-128/2016, ECRA Carbon Capture and Storage (CSS) Project Report on Phase IV.A, 44 pages (Dec. 2009).
Zhang et al., "Numerical Simulation of Oxy-Fuel Combustion with Different O2/ CO2 Fractions in a Large Cement Precalciner", Energy Fuels, 34: 4949-4957 (2020).
Ditaranto et al., "Study of a full scale oxy-fuel cement rotary kiln", International Journal of Greenhouse Gas Control, 83: 166-175 (2019).

(Continued)

*Primary Examiner* — Marites A Guino-O Uzzle
(74) *Attorney, Agent, or Firm* — thyssenkrupp North America, LLC

(57)　　　　ABSTRACT

A process for producing cement clinker may involve preheating raw meal in a preheater, calcining the preheated raw meal in a calciner, burning the preheated and calcined raw meal in a furnace to give cement clinker, cooling the cement clinker in a cooler, branching off a portion of the furnace offgases flowing out of the furnace as bypass gas, cooling the bypass gas in a mixing chamber with a cooling gas, and separating out dust present in the bypass gas. The cooling gas is formed at least partly or completely from the bypass gas and/or the calciner offgas and/or the preheater offgas. The cooling gas is introduced into the mixing chamber in a ratio of 2-10:1 relative to the bypass gas.

6 Claims, 3 Drawing Sheets

(56) References Cited

FOREIGN PATENT DOCUMENTS

| DE | 2801161 A1 | 7/1979 | |
|---|---|---|---|
| DE | 30 37 929 A1 | 5/1981 | |
| DE | 3417148 A1 | 11/1985 | |
| DE | 37 01 964 A1 | 8/1988 | |
| DE | 38 00 895 A1 | 7/1989 | |
| DE | 38 17 357 A1 | 11/1989 | |
| DE | 38 34 215 A1 | 4/1990 | |
| DE | 196 49 922 A1 | 6/1998 | |
| DE | 10327028 A1 * | 1/2005 | ............ B01D 53/38 |
| DE | 603 00 939 T2 | 5/2006 | |
| DE | 10 2008 023 899 A1 | 11/2009 | |
| DE | 10 2009 041 089 A1 | 3/2011 | |
| DE | 10 2013 112 695 A1 | 6/2014 | |
| DE | 10 2013 006 140 A1 | 10/2014 | |
| DE | 10 2013 020 722 A1 | 6/2015 | |
| DE | 10 2015 004 577 B3 | 9/2015 | |
| DE | 102017119155 B3 * | 5/2018 | ............... F27B 7/36 |
| DE | 10 2017 126 961 A1 | 5/2019 | |
| DE | 10 2018 206 673 A1 | 10/2019 | |
| DE | 10 2020 203 289 A1 | 9/2021 | |
| DE | 10 2020 204 519 A1 | 10/2021 | |
| DE | 10 2020 204 520 A1 | 10/2021 | |
| DE | 10 2020 205 672 A1 | 11/2021 | |
| EP | 0 455 301 A2 | 11/1991 | |
| EP | 0 526 770 A2 | 2/1993 | |
| EP | 1 316 536 A2 | 6/2003 | |
| EP | 2086903 A2 | 8/2009 | |
| EP | 2 868 635 A1 | 5/2015 | |
| EP | 2 881 377 A1 | 6/2015 | |
| EP | 3 115 345 A1 | 1/2017 | |
| FR | 2 921 059 A1 | 3/2009 | |
| JP | S55-015980 A | 2/1980 | |
| JP | S55-085441 A | 6/1980 | |
| JP | S55-097239 A | 7/1980 | |
| JP | S59-152251 A | 8/1984 | |
| JP | H11-090371 A | 4/1999 | |
| JP | 2006-207924 A | 8/2006 | |
| JP | 65-54910 B2 | 12/2016 | |
| WO | 99/06778 A1 | 2/1999 | |
| WO | 03/074956 A1 | 9/2003 | |
| WO | 2005/070845 A2 | 8/2005 | |
| WO | 2006/113673 A2 | 10/2006 | |
| WO | 2013/024340 A1 | 2/2013 | |
| WO | 2015/077818 A1 | 6/2015 | |
| WO | 2016/038076 A1 | 3/2016 | |
| WO | 2017/220457 A1 | 12/2017 | |
| WO | 2019/038148 A1 | 2/2019 | |
| WO | 2019/154723 A1 | 8/2019 | |
| WO | 2019/211202 A1 | 11/2019 | |
| WO | 2021/224129 A1 | 11/2021 | |

OTHER PUBLICATIONS

Gerbelová et al., "Feasibility assessment of CO2 capture retrofitted to an existing cement plant: post-combustion vs. oxy-fuel combustion technology", Energy Procedia, 114: 6141-6149 (2017).
IEA Greenhouse Gas R&D Programme (IEA GHG), "CO2 Capture in the Cement Industry", Mar. 2008 (Jul. 2008).
Carrasco et al., "Experimental investigations of oxyfuel burner for cement production", Fuel 236: 608-614 (2019.).
Hou et al., "Oxy-Fuel Combustion Characteristics of Pulverized Coal under O2/Recirculated Flue Gas Atmospheres", Appl. Sci., 10:1362 (2020).
CEMCAP Report, "CO2 capture from cement production, D 8.1 Status Report on Calciner Technology Revision 2" (2020).
Technical Report, TR-ECRA (European Cement Research Academy) 106/2009 ECRA CCS Project—Report about Phase II of the ECRA study, 83 pages (Jun. 22, 2009).
English Translation of International Search Report issued in PCT/EP2021/057662, dated May 31, 2021.
Peray, The Rotary Cement Kiln, 2nd Edition, Chemical Publishing Co., Inc. (1986).

Achternbosch, M. et al., Forschungszentrum Karlsruhe GmbH, Herstellung von Zementklinker, Verfahrensbeschreibung und Analysen zum Einsatz von Sekundärbrennstoffen (2000).
Koring, Kristina Dipl.-ling, Schriftenreihe der Zementindustrie Heft 79/2013, CO2-Emissionsminderungspotential und technologische Auswirkungen der Oxyfuel-Technologie im Zementklinkerbrennprozess (2013).
Taylor, H.F.W., Cement Chemistry, 2nd edition (1997).
Verlag Bau and Technik GmbH, Zement-Taschenbuch, 51. Auflage, Verein Deutscher Zementwerke e.V., Forschungsinstitut der Zementindustrie (2008).
Baukal, Jr., Charles E., Industrial Burners Handbook, Industrial Burners Handbook (2003).
Tran, H.N. et al., An overview of ring formation in lime kilns, Kraft Pulping, Tappi Journal, pp. 131-136 (1991).
Pisaroni, M. et al., Counteracting ring formation in rotary kilns, Journal of Mathematics in Industry, pp. 1-19 (2012).
Kawasaki, New Product Introduction, Kawasaki Spouted Bed and Vortex Chamber (DeNOx pre-calciner)—Addressing the global trend of strict environmental regulations, Kawasaki Technical Review, No. 176, p. 59-62 (2016).
Markewitz, P., et al., Forschungszentrum Jülich GmbH, Technologiebericht, 2.3 CO2-Abscheidung und-Speicherung (CCS) innerhalb des Forschungsprojekts TF_Energiewende (2017).
Burgers, K., et al., Oxyfuel Combustion Conference 3, CO2 Processing Unit for Oxy-Fuel Fired Rotary Cement Kiln (2013).
CEMCAP, 23,01, CO2 capture from cement production, 34 pages (2018).
Stadler, Konrad, et al., ZKG International (Process Know-how), Modell-prädiktive, Regelung des Calcinators im Holcim Werk Lägerdorf mit dem ABB Expert Optimizer, No. 3, vol. 60 (2007).
Integrated Pollution Prevention and Control (IPPC), Reference Document on Best Available Techniques in the Cement and Lime Manufacturing Industries, Cement and Lime Manufacturing Industries, 127 pgs. (Dec. 2001).
PID-Controller, https://web.archive.org/web/20200417150608 /https://en.wikipedia.org/wiki/PID_controller, 26 pgs., Wikipedia (Apr. 17, 2020).
Hökfors, Bodil et al., Modelling the cement process and cement clinker quality, Advances in Cement Research, ice Publishing, vol. 26, issue 6, 8 pages (2014).
Eriksson, M. et al., Oxyfuel combustion in rotary kiln lime production, Energy Science & Engineering, 13 pgs.(2014).
ZKF-Handbuch Zementanlagenbau 2013/2014, Leitfaden für Einsteiger in die Zementindustrie, Heidelberg Cement AG, 76 pgs. (2013).
Zeman, Frank et al., The Earth Institute at Columbia University, The Reduced Emission Oxygen Kiln (Jul. 31, 2008).
Holpert, Morten, et al., Process Control, True optimisation, 5 pgs. (Jul. 2009).
Technologie der Bindebaustoffe, Brennprozess und Brennanlagen, Band 3, VEB Verlag für Bauwesen Berlin, 235 pgs. (1978).
European Cement Research Academy GmbH, Carbon Capture Technology—Options and Potentials for the Cement Industry, 96 pgs. (2007).
European Cement Research Academy GmbH, ECRA CCS Project—Report on Phase III, 107 pgs. (2012).
CEMCAP, Cost of critical components in CO2 capture processes, 35 pgs. (Oct. 20, 2018).
CEMCAP, Status Report on Calciner Technology Revision 2, 26 pgs. (May 1, 2015).
Verein Deutscher Zementwerke, VDZ, Hrsg., "Dekarbonisierung von Zement und Beton—Minderungspfade und Handlungsstrategien" (Decarbonization before cement and concrete: Mitigation-pathways and action strategies, Düsseldorf, 60 pages (2020).
F. Zeman, "Oxygen combustion in cement production", Energy Procedia 1, 187-194 (2009).
ECRA flyer, "The cement industry's approach to carbon capture", taken from E13, reference to ECRA Report oh Phase III, 1 page (2012).
European Cement Research Academy Technical Report AN-2018/0347, "False air intrusion: State-of-the-art technologies and advanced sealing measures" (Dec. 2018).

(56) References Cited

OTHER PUBLICATIONS

Kroupa, Ralph, "Ventiltechnologie im Anlagenbau" (Valve in plant engineering)-1. Aufl.—Weinheim; New York: Basel: Cambridge: Tokyo: VCH, 1094 ISBN 3-527-286 12-8 (1994).
W. Walcher, "Praktikum der Physik"; Tebuner Studienbücher Physik, Teubner Stuttgart; ISBN 3-519-03038-1 (Auszug), 6 pages (1989).
H. Schoffmann, M. Weichiniger, "Practical capability of difference CI bypass systems", International congress on process technology of cement manufacturing; VDZ Congress 2002; 246-251; 2004; ISBN: 8188305162.

* cited by examiner

METHOD AND DEVICE FOR THE PRODUCTION OF CEMENT CLINKER

CROSS REFERENCE TO RELATED APPLICATIONS

This application is a U.S. National Stage Entry of International Patent Application Serial Number PCT/EP2021/057662, filed Mar. 25, 2021, which claims priority to German Patent Application No. DE 10 2020 204 519.4, filed Apr. 8, 2020, and Belgian Patent Application No. BE 2020/5226, filed Apr. 8, 2020, the entire contents of all of which are incorporated herein by reference.

FIELD

The present disclosure generally relates to processes and apparatuses for producing cement clinker, including processes and apparatuses where a bypass gas is branched off and dedusted.

BACKGROUND

The prior art discloses introduction of oxygenous gas into the rotary furnace or the calciner of a cement production plant for combustion of fuel. For reduction of the amount of offgas and in order to be able to dispense with complex purification methods, DE 10 2018 206 673 A1, for example, discloses using a combustion gas with a maximum oxygen level, such that the $CO_2$ content in the offgas is high. DE 10 2018 206 673 A1 discloses the introducing of an oxygenous gas into the cooler inlet region for preheating of the gas and cooling of the clinker.

Especially when substitute fuels are used in the furnace of the cement production plant, cleaning of the furnace offgases in a substream of the offgas in the form of a bypass is necessary in order to separate pollutants out of the bypass gas. The bypass gas recycled into the cement production process frequently has too low an oxygen and $CO_2$ concentration and too high a concentration of further offgas components, for example nitrogen, such that, for example, the formation of nitrogen oxides is favored.

Thus a need exists for an apparatus and a process for producing cement clinker, wherein a high $CO_2$ concentration in the offgas and cost-optimized utilization of the oxygen concentration of the process gases within the cement production plant is ensured.

DETAILED DESCRIPTION

Figure 1:
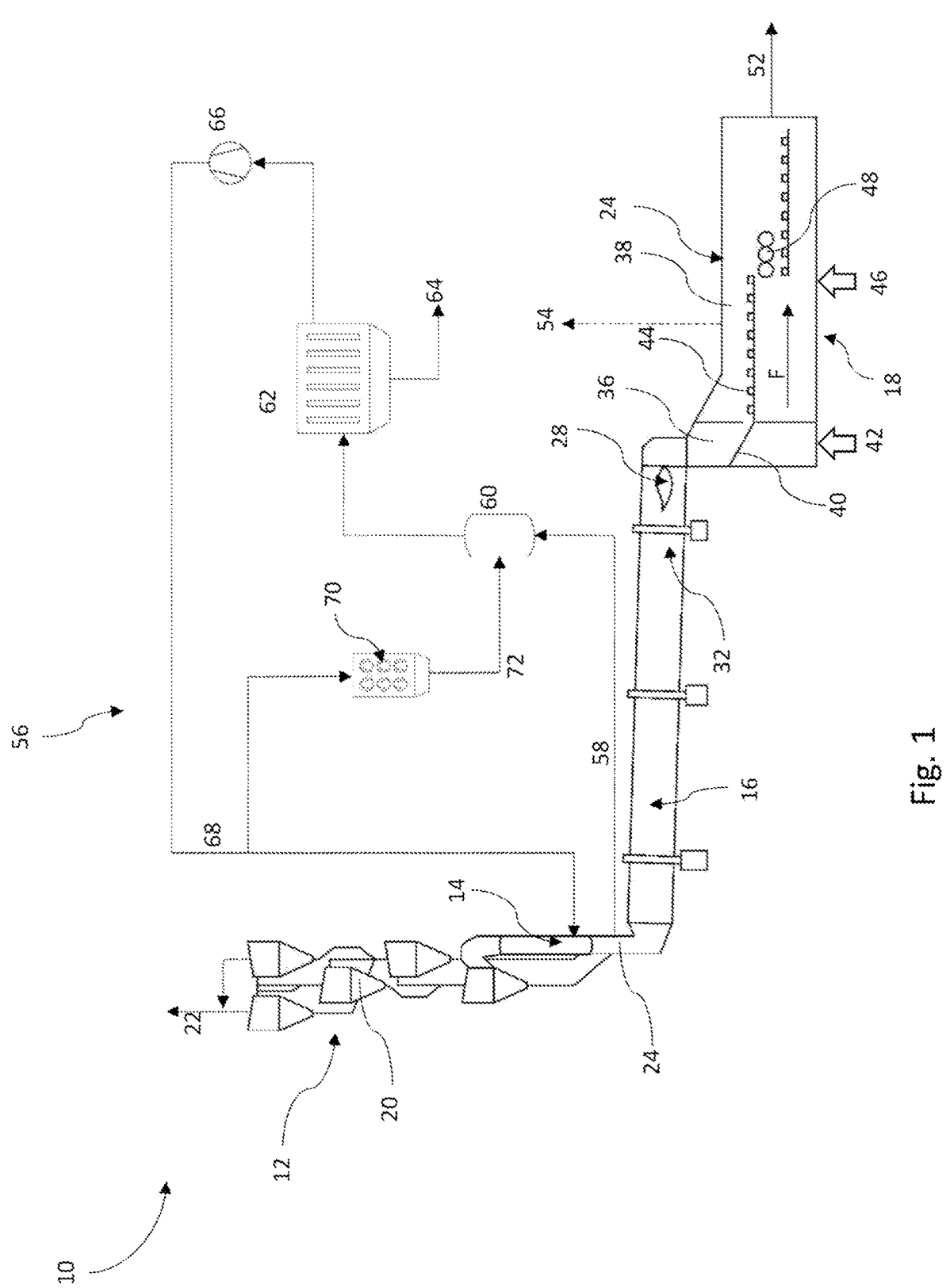
FIG. 1 is a schematic diagram of an example cement production plant with a bypass system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In a first aspect, a process for producing cement clinker comprises the following, preferably successive, steps:

preheating raw meal in a preheater, calcining the preheated raw meal in a calciner, burning the preheated and calcined raw meal in a furnace to give cement clinker, cooling the cement clinker in a cooler, branching off a portion of the furnace offgases flowing out of the furnace as bypass gas, cooling the bypass gas in a mixing chamber with a cooling gas, and separating out dust present in the bypass gas, The cooling gas is formed partly or completely from the bypass gas and/or the calciner offgas and/or the preheater offgas. The calciner offgas is understood to mean the offgas emerging from the calciner. The calciner offgas preferably flows through the preheater. The preheater offgas therefore comprises the calciner offgas or consists, for example, entirely of the calciner offgas. For example, a portion of the preheater offgas is branched off and used as cooling gas. It is likewise conceivable that a portion of the cooling gas is formed from the bypass gas and/or the calciner offgas and, for example, a further portion of the cooling gas is formed from a gas stream that has not been taken from the cement process. This may, for example, be blast furnace offgas. The gas stream preferably has a low concentration of nitrogen, argon and/or other uncondensable gases. The uncondensable gases such as nitrogen and argon preferably comprise a proportion of not more than 20%, preferably less than 5%, in the gas stream.

A cement production plant preferably comprises, in flow direction of the material, a preheater, a calciner, a furnace and a cooler. In a cement production plant, the raw meal to be treated is introduced into a preheater and preheated. The preheater comprises a multitude of cyclone stages for separation of the raw meal from the gas stream. The gas stream flowing through the preheater in countercurrent to the raw meal serves to preheat the raw meal before it enters the calciner and the furnace, with formation of the gas stream from the furnace offgas and the calciner offgas. The raw meal preheated in the preheater is passed into the calciner between the last and second-from-last cyclone stage in flow direction of the material and calcined there. Thereafter, the calcined raw meal is guided into the last cyclone stage and thence into the furnace. The furnace offgas flows first through the calciner, then the preheater, and leaves the preheater preferably beyond the first cyclone stage in flow direction of the offgas as preheater offgas.

The furnace is preferably a rotary furnace with a rotary tube which is rotatable about its longitudinal axis and is preferably slightly inclined in conveying direction of the material to be burnt, such that the material is moved in conveying direction by virtue of the rotation of the rotary tube and gravity. The furnace preferably has, at one end, a material inlet for introduction of preheated raw meal and, at its opposite end from the material inlet, a material outlet for discharging the burnt clinker into the cooler. At the material outlet end of the furnace is preferably disposed the furnace head that has the burner for burning the material and preferably a fuel inlet for introduction of fuel into the furnace, preferably to the burner. The furnace preferably has a sintering zone in which the material is at least partly melted and especially has a temperature of 1500° C. to 1800° C., preferably 1450° C. to 1700° C. The sintering zone comprises, for example, the furnace head, preferably the last third or the last two thirds of the furnace in conveying direction of the material.

The combustion gas is, for example, partly or completely introduced directly into the furnace head, in which case the furnace head has, for example, a combustion gas inlet. The combustion gas is preferably introduced partly or completely into the furnace via the material outlet thereof.

The material outlet of the furnace is preferably connected to the cooler for cooling the cement clinker. The cooler preferably has a cooling gas space through which a cooling gas stream for cooling of the bulk material can flow in crossflow, wherein the cooling gas space comprises a first cooling gas space section with a first cooling gas stream and a second cooling gas space section with a second cooling gas stream that follows on in conveying direction of the clinker, and wherein the combustion gas fed to the furnace is formed completely or partly by the first cooling gas stream.

The cooler has a conveying device for conveying the bulk material in conveying direction through the cooling gas space. The cooling gas space comprises a first cooling gas space section with a first cooling gas stream and a second cooling gas space section which adjoins the latter in conveying direction of the bulk material and has a second cooling gas stream. The cooling gas space is preferably bounded at the top by a cooling gas space roof and at the bottom by a dynamic and/or static grid, preferably the bulk material lying thereon. The cooling gas space is especially the entire cooler space through which cooling gas flows above the bulk material. The cooling gas stream flows through the dynamic and/or static grid, especially through the conveying device, through the bulk material and into the cooling gas space. The first cooling gas space section is preferably disposed directly beyond the cooler inlet, especially the material outlet from the furnace, in flow direction of the bulk material to be cooled. The clinker preferably falls out of the furnace into the first cooling gas space section.

The first cooling space section preferably has a static grid and/or dynamic grid disposed beneath the material outlet from the furnace, such that the clinker exiting from the furnace falls onto the static grid under gravity. The static grid is, for example, a grid set at an angle to the horizontal of 10° to 35°, preferably 12° to 33°, especially 13° to 21°, through which the first cooling gas stream flows from beneath. What flows into the first cooling gas space section is preferably exclusively the first cooling gas stream, which is accelerated, for example, by means of a ventilator. The second cooling gas space section adjoins the first cooling gas space section in conveying direction of the bulk material and is preferably separated for gas purposes from the first cooling gas space section by means of a dividing apparatus. What flows into the second cooling gas space section is preferably exclusively the second cooling gas stream, which is accelerated, for example, by means of a ventilator.

The second cooling gas space section preferably has a dynamic grid for conveying of the bulk material through the cooling gas space. The dynamic grid comprises a conveying unit for transport of the material in conveying direction, with the conveying unit having, for example, a ventilated floor through which cooling gas can flow and which has a multitude of flow openings for introduction of cooling gas.

The cooling gas is provided, for example, by ventilators disposed beneath the ventilated floor, such that a cooling gas, for example cooling air, flows through the bulk material to be cooled in a transverse flow to the conveying direction. The ventilated floor preferably forms a plane on which the bulk material lies. The conveying unit additionally has a multitude of conveying elements that are movable in conveying direction and counter to conveying direction. The ventilated floor is preferably formed partly or fully by conveying elements which, arranged alongside one another, form a plane for accommodation of the bulk material.

The first cooling gas stream flowing through the first cooling gas space section is, for example, pure oxygen or a gas having a proportion of less than 35% by volume, especially less than 21% by volume, preferably 15% by volume or less, of nitrogen and/or argon and/or an oxygen content of more than 20.5%, especially more than 30%, preferably more than 95%. The first cooling gas section preferably directly adjoins the material outlet from the furnace, preferably the furnace head of the furnace, such that the cooling gas is heated in the cooler and then flows into the rotary furnace and is used as combustion gas. The second cooling gas stream is, for example, air.

The cooler preferably has a dividing apparatus for separation of the cooling gas sections from one another for gas purposes.

For cooling of the bypass gas, the mixing chamber has, for example, a gas inlet for introduction of bypass gas branched off from the furnace offgas or the calciner offgas. In addition, the mixing chamber has a further gas inlet for introduction of cooling gas. The cooling gas and the bypass gas are mixed in the mixing chamber, such that the bypass gas is cooled down, for example, to a temperature of 200-600° C., especially 400° C. to 500° C. It is likewise conceivable to connect a cooling apparatus upstream or downstream of the mixing chamber within the bypass system, such that the bypass gas is cooled down to the aforementioned temperature within the mixing chamber or in a cooling apparatus downstream of the mixing chamber.

A cooling gas formed from the bypass gas and/or the preheater offgas offers the advantage that the cooling gas has a high proportion of $CO_2$ and/or a low proportion of uncondensable gases, and, therefore, the bypass gas, even after cooling in the mixing chamber, can be fed to the cement production process, especially to the calciner, without significantly lowering the $CO_2$ content of the offgas or increasing the proportion of uncondensable gases. A high $CO_2$ content in the offgas enables efficient and simple cleaning of the offgas, which is likewise usable in downstream processes, for example the drying of material for grinding.

In a first embodiment, the cooling gas is formed partly or completely from a portion of the dedusted and cooled bypass gas, wherein any portion of the bypass gas not fed to the mixing chamber is fed to the calciner, the furnace and/or the cooler. For example, the dedusted bypass gas is fed to the furnace head or to the first cooling gas space section. The dedusted bypass gas is an at least partly dedusted gas stream. Preferably, the cooling gas is formed from a proportion of 0% to 70%, especially 20% to 50%, of the dedusted and cooled bypass gas. The bypass gas is divided, preferably beyond the mixing chamber and the dust separator downstream of the mixing chamber, into a cooling gas stream and a calciner gas stream, wherein the cooling gas stream is preferably cooled and fed to the mixing chamber, and the calciner gas stream is fed to the calciner. The dust separator is, for example, a hot gas filter, an electrostatic filter or a separating cyclone.

In a further embodiment, the bypass gas is branched off between the furnace and the calciner or downstream of the calciner. The bypass gas branched off between the furnace and the calciner is preferably at a temperature of 1070° C., with the gas stream branched off downstream of the calciner at a temperature of preferably 920° C.

In a further embodiment, the cooling gas is cooled prior to entry into the mixing chamber. On entry into the mixing chamber, the cooling gas is at a temperature, for example, of 100° C. to 200°, especially 100-120° C. The cooler upstream of the mixing chamber, in a further embodiment, is an evaporative cooler or a gas-gas heat exchanger.

The cooling gas is introduced into the mixing chamber in a ratio of 2 to 10:1, especially 3 to 8:1, preferably 5:1, relative to the bypass gas. This enables reliable cooling of the bypass gas, such that the separation of dust that follows the mixing chamber is possible.

At least a portion of the cooled and dedusted bypass gas, in a further embodiment, is fed to the calciner, the furnace and/or the cooler. For example, the bypass gas, after cooling and the dusting, is fed completely to the calciner, furnace and/or cooler. In this case, the cooling gas is formed, for example, completely from the calciner offgas, especially the preheater offgas. The cooling gas is preferably branched off from the preheater offgas and, for example, cooled in the cooler before it enters the mixing chamber.

In a further embodiment, the furnace and the calciner are supplied with a combustion gas having an oxygen content of more than 20.5%, especially more than 30%, preferably more than 95%. The combustion gas consists, for example, entirely of pure oxygen, wherein the oxygen content of the combustion gas is 100%.

The invention also encompasses a cement production plant having
    a preheater (12) for preheating raw meal,
    a calciner (14) for calcining the preheated raw meal,
    a furnace (16) for burning the raw meal to give cement clinker,
    a cooler (18) for cooling the cement clinker, and
    a bypass system having
        a bypass conduit which is connected downstream of the furnace in flow direction of the furnace offgas for branching off a portion of the furnace offgases as bypass gas,
        a mixing chamber for cooling the bypass gas with a cooling gas, and
        a dust separator for separating out dust present in the bypass gas.

The dust separator and/or the preheater and/or the calciner is/are connected to the mixing chamber for introduction of cooling gas into the mixing chamber. The details and advantages described in relation to the process for producing cement clinker are also applicable to the cement production plant in a corresponding manner for apparatus purposes. The mixing chamber is designed such that the cooling gas is introduced into the mixing chamber in a ratio of 2-10:1 relative to the bypass gas. In particular, the mixing chamber has a control device designed to adjust the volume of cooling gas into the mixing chamber, especially under open-loop and/or closed-loop control. For example, the mixing chamber has a metering device, such as a valve, by means of which the volume of cooling gas is adjustable and which is preferably connected to the control device.

The bypass system, in one embodiment, has a branch for branching off a portion of the bypass gas which is downstream of the dust separator and is connected to the mixing chamber for guiding of a portion of the bypass gas and to the calciner, the furnace and/or the cooler for guiding of another portion of the bypass gas.

In a further embodiment, the bypass conduit is disposed between the furnace and the calciner or downstream of the calciner.

The bypass system, in a further embodiment, has a cooler upstream of the mixing chamber. In a further embodiment, the cooler is an evaporative cooler or a gas-gas heat exchanger.

FIG. 1 shows a cement production plant 10 with a preheater 12 for preheating of raw meal, a calciner 14 for calcining of the raw meal, a furnace 16, especially a rotary furnace, for burning of the raw meal to give clinker, and a cooler 18 for cooling the clinker burnt in the furnace 16.

The preheater 12 comprises a multitude of cyclones 20 for separation of the raw meal out of the raw meal gas stream. By way of example, the preheater 12 has five cyclones 20 arranged in four cyclone stages one below another. The preheater 12 has a material inlet (not shown) for introduction of the raw meal into the uppermost cyclone stage of the preheater 12 that comprises two cyclones 20. The raw meal flows successively through the cyclones 20 of the cyclone stages in countercurrent to the furnace offgas and is heated as a result. The calciner 14 is disposed between the last and penultimate cyclone stages. The calciner 14 has a riser with at least one burner for heating of the raw meal, such that the raw meal is calcined in the calciner 14. In addition, the calciner 14 has a fuel inlet for introducing fuel into the riser. The calciner 14 also has a combustion gas inlet for introducing combustion gas into the riser of the calciner 14. The combustion gas is, for example, pure oxygen or a gas having an oxygen content of at least 85%. The calciner offgas is introduced into the preheater 12, preferably into the last cyclone stage, and leaves the preheater 12 beyond the uppermost cyclone stage as preheater offgas 22.

Connected downstream of the preheater 12 in flow direction of the raw meal is the furnace 16, such that the raw meal preheated in the preheater 12 and calcined in the calciner 14 flows into the furnace 16. The furnace gas outlet 24, especially material inlet, of the furnace 16 is connected directly to the riser of the calciner 14, such that the furnace offgas flows into the calciner 14 and subsequently into the preheater 12. The furnace 16 is, by way of example, a rotary furnace having a rotary tube rotatable about its longitudinal axis, arranged at a slightly declining angle. The furnace 12 has a burner 28 and a corresponding fuel inlet 30 at the material outlet end within the rotary tube. The material outlet from the furnace 16 is disposed at the opposite end of the rotary tube from the material inlet, such that the raw meal is conveyed within the rotary tube by the rotation of the rotary tube in the direction of the burner 28 and of the material outlet. The raw meal is burnt within the furnace 16 to give cement clinker, with the raw meal being heated, for example, in the first third of the rotary tube and burnt, especially sintered, in the downstream region of the rotary tube. The region within the rotary tube in which the raw meal is sintered, especially melted, is referred to as sintering zone 32. The sintering zone 32 comprises the far region of the rotary tube on the material outlet side, preferably the rear third in material flow direction, especially the rear two thirds of the rotary tube.

Following on from the material outlet of the furnace 16 is the cooler 18 for cooling of the clinker. The cooler 18 has a cooling gas space 34 in which the clinker is cooled by a cooling gas stream. The clinker is conveyed in conveying direction F through the cooling gas space 34. The cooling gas space 34 has a first cooling gas space section 36, and a second cooling gas space section 38 which follows on in conveying direction F from the first cooling gas space section 36. The furnace 16 is connected to the cooler 18 via the material outlet of the furnace 16, such that the clinker burnt in the rotary furnace 20 falls into the cooler 18.

The first cooling gas space section 36 is disposed beneath the material outlet of the furnace 16, such that the clinker falls from the furnace 16 into the first cooling gas space section 36. The first cooling gas space section 36 constitutes an intake region for the cooler 18 and preferably has a static grid 40 that receives the clinker exiting from the furnace 16. The static grid 40 is especially disposed entirely within the first cooling gas space section 36 of the cooler 10. The clinker preferably falls out of the furnace 16 directly onto the static grid 40. The static grid 40 extends preferably completely at an angle of 10° to 35°, preferably 14° to 33°, especially 21 to 25, to the horizontal, such that the clinker slides along the static grid 40 in conveying direction.

Following on from the first cooling gas space section 36 is the second cooling gas section 38 of the cooler 18. In the first cooling gas space section 36 of the cooler 18, the clinker is especially cooled to a temperature of less than 1100° C., the cooling being effected in such a way that liquid phases present in the clinker are fully solidified to solid phases. When it leaves the first cooling gas space section 36 of the cooler 18, the clinker is preferably completely in the solid phase and at a temperature of not more than 1100° C. In the second cooling gas space section 38 of the cooler 18, the clinker is cooled down further, preferably to a temperature of less than 100° C. The second cooling gas stream can preferably be divided into multiple gas substreams having different temperatures.

The static grid of the first cooling gas space section 36 has, for example, passages through which a cooling gas enters the cooler 18 and the clinker. The cooling gas is generated, for example, by means of at least one ventilator disposed beneath the static grid 40, such that a first cooling gas stream 42 flows from below through the static grid into the first cooling gas space section 36. The first cooling gas stream 42 is, for example, pure oxygen or a gas having a proportion of 15% by volume or less of nitrogen and a proportion of 50% by volume or more of oxygen. The first cooling gas stream 42 flows through the clinker and then flows into the furnace 16. The first cooling gas stream forms, for example, a portion or the entirety of the combustion gas for the furnace 16. The high proportion of oxygen in the combustion gas leads to a furnace offgas consisting essentially of CO2, oxygen and water vapor.

Within the cooler 18, the clinker to be cooled is moved in conveying direction F. The second cooling gas section 38 preferably has a dynamic, especially movable, grid 44 which follows on from the static grid 40 in conveying direction F. The dynamic grid 44 especially has a conveying unit that transports the clinker in conveying direction F. The conveying unit is, for example, a moving floor conveyor having a multitude of conveying elements for transport of the bulk material. The conveying elements in a moving floor conveyor are a multitude of planks, preferably grid planks, that form a ventilated floor. The conveying elements are disposed alongside one another and are movable in conveying direction F and counter to conveying direction F. It is preferably possible for cooling gas stream to flow through the conveying elements in the form of conveying planks or grid planks, and these are disposed over the entire length of the second cooling gas section 38 of the cooler 18 and form the surface on which the clinker lies. The conveying unit may also be a moving conveyor, in which case the conveying unit has a stationary ventilated floor through which cooling gas stream can flow and a multitude of conveying elements movable relative to the ventilated floor. The conveying elements of the moving conveyor are preferably disposed above the ventilated floor and have entrainers that run transverse to conveying direction. For transport of the clinker along the ventilated floor, the conveying elements are movable in conveying direction F and counter to conveying direction F. The conveying elements of the moving conveyor and of the moving floor conveyor may be movable by the "walking floor principle", wherein the conveying elements are all moved simultaneously in conveying direction and non-simultaneously counter to conveying direction. Alternatively, other conveying principles from bulk material technology are also conceivable.

Beneath the dynamic grid 44 are disposed, by way of example, a multitude of ventilators by means of which the second cooling gas stream 46 is blown from below through the dynamic grid 44. The second cooling gas stream 46 is, for example, air.

Following on from the dynamic grid 44 of the second cooling gas space section 38 in FIG. 1, by way of example, is a comminuting device 48. The comminuting device 48 is, for example, a crusher having at least two crusher rolls that are rotatable in opposing directions and a crusher nip formed between them, in which the comminution of the material takes place. Following on from the comminuting device 48 is a further dynamic grid 50 beneath the comminuting device 48. The cold clinker 52 on departure from the cooler 18 is preferably at a temperature of 100° C. or less.

The cement production plant 10 of FIG. 1 additionally has a bypass system 56. The bypass system 56 comprises a bypass conduit 58 for branching off a portion of the furnace offgases flowing to the calciner as bypass gas. The bypass conduit 58 is connected to the furnace offgas outlet 24, such that a portion of the offgas discharged from the furnace 24 is guided into the calciner 14 and another portion is guided into the bypass conduit 58. In addition, the bypass system comprises a cooling device 60 for cooling of the bypass gas with a cooling gas. The cooling device 60 is directly connected to the furnace offgas outlet 24 via the bypass conduit 58. The cooling device 60 is, for example, a mixing chamber. For example, the cooling device 60 has a cooling gas inlet for introducing cooling gas into the cooling device 60, and a bypass gas outlet for discharging the cooled bypass gas from the cooling device 60. The cooled bypass gas leaving the cooling device 60 has, for example, a temperature of 200° C. to 600° C., especially 400-500° C., and is guided into a dust separator 62 downstream of the cooling device 60. The dust separator has a solids outlet for discharging the separated dust 64, and a gas outlet for discharging the dedusted and cooled bypass gas. Following on from the dust separator 62 is a fan for accelerating the cooled and dedusted bypass gas. The bypass system 56 additionally has, downstream of the fan, a branch 68 for branching off a portion of the dedusted and cooled bypass gas, which is connected to the calciner 14 and a cooler 70, such that a portion of the dedusted and cooled bypass gas is guided into the calciner 14 and the other portion into the cooler 70. The cooler is, for example, an evaporative cooler or a gas-gas heat exchanger. The dedusted and cooled bypass gas fed to the calciner 14 is at a temperature, for example, of 200° C. to 600° C., especially 400-500° C. The cooler 10 is connected to the cooling device 60, which is in the form of a mixing chamber by way of example. The branched-off, cooled and dedusted bypass gas leaves the cooler 70 as cooling gas 72 and is fed to the cooling device 60 for cooling of the bypass gas branched off from the furnace offgas outlet 24. The cooling gas 72 is at a temperature, for example, of 100° C. to 200° C., especially 100-120° C.

In the working example of FIG. 1, the cooling gas for cooling of the bypass gas in the cooling device 60 is formed by the in flow direction of the bypass gas beyond the cooling device 60 and the separator 62 bypass gas, which is additionally cooled further by means of a cooler 70. Thus, the additional introduction of cooling air into the cooling device 60 is dispensed with, such that the proportion of uncondensable gases in the bypass gas does not rise and, for example, the $CO_2$ content of the bypass gas recycled into the calciner remains constant and high.

Figure 2:
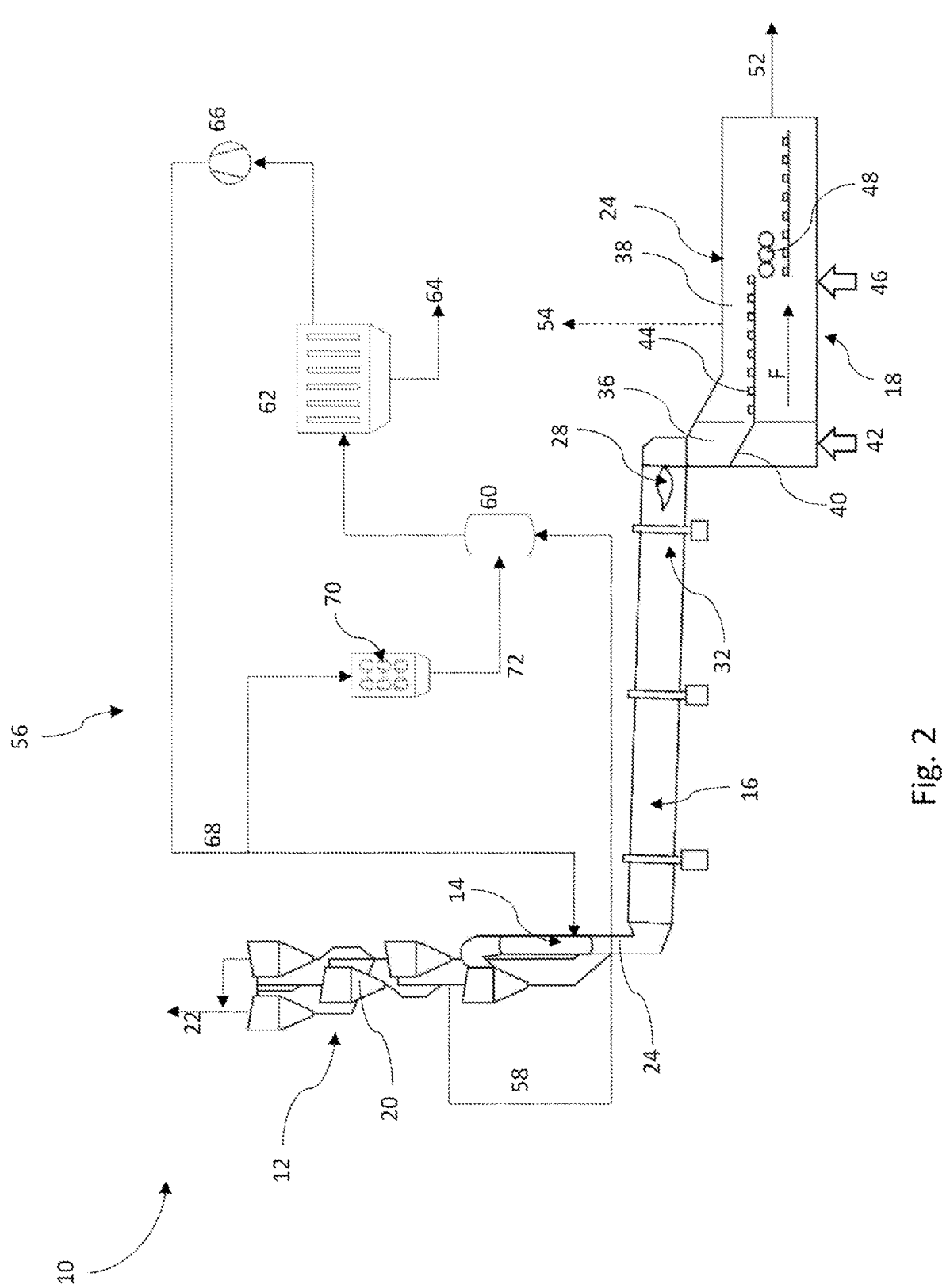
FIG. 2 is a schematic diagram of another example cement production plant with a bypass system.

FIG. 2 shows a further embodiment of the cement production plant 10 that corresponds essentially to the cement production plant shown in FIG. 1. Identical elements are given the same reference numerals. By contrast with FIG. 1, FIG. 2 shows a cement production plant 10 with a bypass conduit 58 connected to the preheater 12. In particular, the bypass conduit 58, in flow direction of the furnace offgas, is disposed beyond the lowermost cyclone stage, preferably between the calciner 14 and the second-from-last cyclone stage. The offgas flowing through the preheater at this point is preferably at a temperature of 920° C. It is likewise conceivable to dispose the bypass conduit 58 at another position within the preheater 12, preferably upstream of the uppermost cyclone stage.

Figure 3:
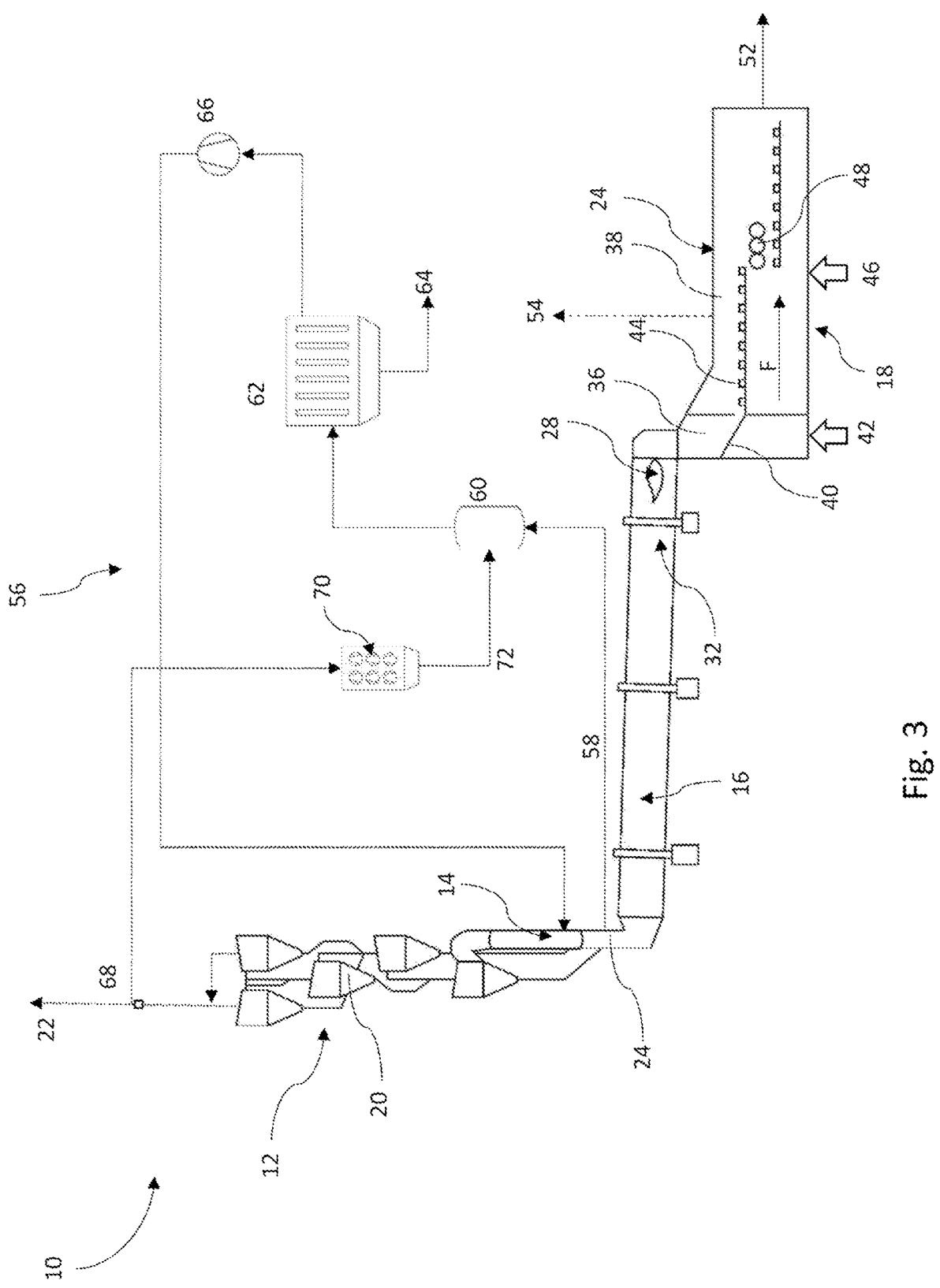
FIG. 3 is a schematic diagram of still another example cement production plant with a bypass system.

FIG. 3 shows a further embodiment of the cement production plant 10, which corresponds essentially to the cement production plant shown in FIG. 1. Identical elements are given the same reference numerals. By contrast with FIG. 1, FIG. 3 shows a cement production plant 10, wherein the cooling gas 72 flowing into the cooling device 60 is formed by a from the preheater offgas 22 gas stream. The branch 68, by contrast with FIG. 1, is disposed upstream of the preheater 12 for branching-off of a portion of the preheater offgas 22. The branched-off preheater offgas is guided into the cooler 70 of the bypass system 56 and preferably cooled to a temperature of 100° C. to 200° C., especially 100 to 120° C. Subsequently, it is introduced into the cooling device 60 designed as a mixing chamber for cooling of the bypass gas branched off from the furnace offgas outlet.

Optionally, the cooled and dedusted bypass gas, in FIGS. 1 to 3, in addition to being fed to the calciner 14, is fed partly to the furnace 16 and/or the cooler 18. For sake of clarity, the corresponding conduits are not shown in FIGS. 1 to 3. The cooled and dedusted bypass gas is fed, for example, to the first cooling gas space section 36 and at least partly forms the first cooling gas stream 42. It is likewise conceivable to feed a portion of the cooled and dedusted bypass gas to the furnace 16, preferably to the furnace head and/or to the sintering zone 32.

LIST OF REFERENCE NUMERALS 10 cement production plant
12 preheater
14 calciner
16 furnace
18 cooler 20 cyclone
22 preheater offgas
24 furnace offgas outlet
28 furnace burner
30 furnace fuel outlet
32 sintering zone
34 cooling gas space
36 first cooling gas space section
38 second cooling gas space section
40 static grid
42 first cooling gas stream
44 dynamic grid
46 second cooling gas stream
48 comminuting device
50 dynamic grid
52 cold clinker
54 cooler output air
56 bypass system
58 bypass conduit
60 mixing chamber
62 dust separator
64 separated dust
66 fan
68 branch
70 cooler
72 cooling gas

What is claimed is:

1. A process for producing cement clinker, the process comprising:
    preheating raw meal in a preheater;
    calcining in a calciner the raw meal that has been preheated;
    burning in a furnace the raw meal that has been preheated and calcined to give cement clinker;
    cooling the cement clinker in a cooler;
    branching off a portion of furnace offgases flowing out of the furnace as bypass gas; and
    cooling the bypass gas in a mixing chamber with a cooling gas and separating out dust present in the bypass gas, wherein the cooling gas is formed at least partly or completely from at least one of the bypass gas, a calciner offgas, or a preheater offgas,
    wherein the cooling gas is introduced into the mixing chamber in a ratio of 2-10:1 relative to the bypass gas;
    wherein the cooling gas is formed partly or completely from a portion of the bypass gas that has been dedusted and cooled without passing back through the preheater, calciner, or furnace, wherein a portion of the bypass gas that is not fed to the mixing chamber is fed to at least one of the calciner, the furnace, or the cooler.

2. The process of claim 1 wherein the bypass gas is branched off between the furnace and the calciner.

3. The process of claim 1 wherein the bypass gas is branched off downstream of the calciner.

4. The process of claim 1 wherein the cooling gas is cooled in a second cooler prior to entry into the mixing chamber.

5. The process of claim 4 wherein the second cooler that is upstream of the mixing chamber is an evaporative cooler or a gas-gas heat exchanger.

6. The process of claim 1 wherein at least a portion of the bypass gas that is cooled and dedusted is fed to at least one of the calciner, the furnace, or the cooler.

* * * * *